US006535369B1

(12) United States Patent
Redding et al.

(10) Patent No.: US 6,535,369 B1
(45) Date of Patent: Mar. 18, 2003

(54) ADAPTIVE SURGE SUPPRESSOR

(75) Inventors: Randall J. Redding, Buckley, WA (US); Victor Soto, Valley Center, CA (US); Reynaldo P. Llanos, Escondido, CA (US)

(73) Assignee: Teal Electronics Corporation, San Diego, CA (US)

( * ) Notice: Subject to any disclaimer, the term of this patent is extended or adjusted under 35 U.S.C. 154(b) by 335 days.

(21) Appl. No.: 09/596,172

(22) Filed: Jun. 16, 2000

(51) Int. Cl.[7] ................................................ H02H 9/00
(52) U.S. Cl. ...................... 361/111; 361/91.1; 361/117; 361/118
(58) Field of Search ............................ 361/62, 64, 63, 361/65, 66, 91.1, 91.2, 111, 117, 118, 120, 124

(56) References Cited

U.S. PATENT DOCUMENTS

| 5,032,946 A | 7/1991 | Misencik et al. ............. 361/56 |
| 5,379,177 A | 1/1995 | Bird ............................ 361/118 |
| 5,418,490 A | 5/1995 | Kaegebein ............... 330/124 D |
| 5,583,734 A | * 12/1996 | McMills et al. ............ 361/124 |
| 5,790,360 A | 8/1998 | Ryan ........................... 361/111 |
| 5,914,662 A | 6/1999 | Burleigh ..................... 340/635 |
| 5,914,845 A | 6/1999 | Chase .......................... 361/111 |
| 5,917,253 A | * 6/1999 | Rusnack ...................... 307/64 |
| 5,946,175 A | 8/1999 | Yu ............................... 361/56 |
| 5,978,198 A | 11/1999 | Packard et al. ............. 361/111 |

* cited by examiner

Primary Examiner—Stephen W. Jackson
(74) Attorney, Agent, or Firm—The Maxham Firm

(57) ABSTRACT

A surge suppressor circuit with imminent failure detection and self-maintenance capability. The circuit includes at least two surge suppressor elements. The first suppressor element is initially actively connected to the circuit being protected and, as this suppressor element approaches failure, or after failure, the circuit switches out the used suppressor element and automatically activates a subsequent or backup suppressor element. At least one subsequent suppressor element is initially in a backup mode and is not conductively connected to the circuit being protected until the first suppressor element nears failure, begins to fail, or fails. Additional backup stages can be added as needed. Circuitry for detection or display of the status of the assembly can be included to give one or more feedback signals to personnel or to other equipment. Such feedback could be in the form of an analog signal or a digital signal. Display of the feedback can be accomplished using any common methods such as meters, status indicators, digital displays, or computer generated displays, among others.

24 Claims, 9 Drawing Sheets

ADAPTIVE SURGE SUPPRESSOR

BACKGROUND OF THE INVENTION

1. Field of the Invention

This invention relates generally to surge suppressor circuits to provide protection to sensitive electronic or electrical equipment from high energy transient voltage events, and more specifically to a circuit that employs more than one suppressor element with one such element initially actively connected in the circuit, whereby the device automatically switches to a subsequent suppressor when the original suppressor element is close to failing or has failed. At least one suppressor element is not exposed to transient voltage events at any one time.

2. Discussion of Prior Art

Surge suppressors are devices that protect sensitive electronic and electrical equipment from high energy voltage transients. A number of devices are very susceptible to high voltage, high energy events and require surge suppressors to protect them from the harm the event can cause. There are several devices that fit in the category of "surge suppressor." Inductor/capacitor networks and avalanche diodes are a couple of examples. However, only a few of the available devices have the speed, size, cost effectiveness, and energy handling capability to be an effective device for protecting a system from these events. Metal oxide varistors (MOVs) and silicon avalanche diodes (SADs) are two products that are frequently used because they currently have high performance in all of the above categories. However, MOVs tend to wear down with each transient voltage event until they eventually fail, and SADs offer lower energy handling capabilities at comparable cost. When either of these devices fails the result can be an explosion that can sometimes lead to fire. Care must be taken by users to control the results of the eventual failure of such devices.

The most common method of controlling the results of a suppressor failure is to place a fuse in series with the suppressor, where the fuse opens when high current goes into the suppressor for long periods of time (5–10 ms, for example). Various methods of detecting that the fuse is blown are also commonly used to provide a warning signal to the user that the load is no longer being protected. A disadvantage of the fuse is that only high current is detected and interrupted.

Another conventional method incorporates a low melting point solder that eventually melts due to the heat generated by a failing suppressor. When the solder melts, the circuit is interrupted in various ways, disconnecting the failed suppressor. There are several disadvantages to this method. Under some circumstances the solder will not melt quickly enough and significant heat, smoke and explosion can be produced during that delay. Further, this method does not react to high currents directly and quickly. This results in the requirement of an additional fuse for this purpose, which adds expense and consumes space.

There are a few other methods that also operate by detecting a failed suppressor as the warning that the load is no longer protected. Many of these methods are somewhat sophisticated and use lasers and smoke detectors. Most of these methods share the concept of the fuse and melting solder techniques in that the suppression device is disconnected and the user of the suppression device is warned that load is no longer being protected.

These prior methods of detecting load susceptibility to high energy voltage transients have a major drawback. The load has no protection from high voltage transients after failure and before servicing. Many users of surge suppression devices do not check their surge suppressors daily or even weekly for warnings that the load is not being protected from transient voltages. During this period, their system is unprotected and the probability of failure of the load has increased dramatically. This indicates a need for early detection of suppressor failure so that the load is never vulnerable to high transient voltages.

One method of detecting when the load is close to being unprotected from high voltage transients is to have several suppressors connected in parallel with one another, each parallel leg being in series with a fusing element connected to the load that is to be protected. This method subjects every suppressor in the device to every high voltage transient that is on the line. The device detects when each suppressor fails and the device indicates that the load is getting close to being unprotected by the reduced number of suppressors still functioning properly. This method is effective at giving early indication of susceptibility of the load to high voltage transients. However, there are drawbacks to this method. Because the suppressors are in parallel and all are subjected to high voltage transients, all of the components are degraded together. This means that the amount of remaining protection available is variable and it is difficult to predict when the load will be unprotected.

Another approach sometimes used is a surge suppressor and capacitor filter combination. This method affords a high degree of protection for the load and increases the life span of both components. The suppressor elements in this type of system will eventually fail, just as in previous methods. However, when the suppressor has failed the capacitor filter is still in place to protect the load, although to a lower degree, until the suppressor is replaced. The drawback of this method is that the filter network may not have the capability of shunting enough energy to protect the load to the extent that is necessary.

SUMMARY OF THE INVENTION

A major purpose of the invention is to provide a surge suppression device that is relatively fast, small, cost effective, and has a high energy handling capability. The suppressor circuit also controls the results of failure and continues to protect the load from high voltage transients reliably, while at the same time warning the user that the suppressor protection has been degraded to a pre-defined amount. A function is to provide continual protection to the load from high voltage transients while giving the user adequate time to replace the suppressor element or circuit.

The invention accomplishes these purposes in a single package that incorporates two or more suppressor elements dedicated to protecting a sensitive electrical circuit. The suppressor elements are configured in such a manner that at least one supplemental suppressor element is isolated, inactive, and protected from the harmful transients that the primary suppressor element is subjected to. The performance characteristics of the supplemental suppressor are therefore preserved until the backup is needed and the supplemental suppressor device is connected into active use in the circuit.

In addition, the suppressor circuit is configured to control the results of a failed primary surge suppressor element. This is accomplished using a combination of methods of detecting failure or imminent failure of the primary suppressor element. In one contemplated arrangement this combination consists of a thin conductive material under tension or torsion, that material being soldered to the suppressor element termination using a relatively low melting point temperature solder. This combination accomplishes protection of the suppressor circuit by detecting both high temperature and high current conditions corresponding to failure or imminent failure of a suppressor element.

The preferred method of embodying this invention uses a low melting point, electrically conductive solder to attach a conductive piece which forms a conductive path between a switching mechanism and a suppressor element lead. The conductive piece is sized and configured to respond to high current conditions by fusing. This connecting piece either detaches from the suppressor lead due to the lead temperature of the suppressor rising above a pre-defined point, thereby melting the solder, or due to fusing of the conductive piece due to high current flow through the conductive piece. In either case, this allows the switching mechanism to actuate, thus disconnecting the first suppressor element from the circuit being protected and connecting a subsequent suppressor element to the circuit being protected. The solder has a melting point that is closely correlated with the amount of heat produced and lead temperature presented by a failing suppressor element.

This same method of disconnecting a suppressor element and connecting a fresh suppressor element in the circuit can be cascaded any useful number of times to continually refresh suppressor protection for the load.

A failing suppressor element device can produce expanding gas and propel particles which should be exhausted or controlled. In one embodiment of the invention, the gas and particles are channeled in a non-direct route through the enclosure to an exhaust port. Most particles are kept within the case and only the expanded gas and a small amount of soot exits the case. This avoids damage to adjacent assemblies and reduces the risk of fire.

In one embodiment, the fusing action of the conductive piece is assisted by channeling the expanding gas and propelled particles from a failing suppressor in a mainly perpendicular direction through the conductive piece, thus aiding in quickly clearing the circuit.

It is important that the user be able to observe the functional status of a suppressor device. In combination with the apparatus a sensing means and indication means can be included. The sensing means can be any common sensor device that can detect movement such as a microswitch or a photo emitter/transistor. This sensor can be coupled to any number of display types such as indicator lights, a logic circuit driven display or a field relay intended to convey the status to other equipment.

In another embodiment, the indicators are connected to the switch devices and are visible or not-visible to the user, depending on the position of the switches, thus mechanically indicating status.

BRIEF DESCRIPTION OF THE DRAWING

The objects, advantages and features of this invention will be more readily appreciated from the following detailed description, when read in conjunction with the accompanying drawing, in which.

DETAILED DESCRIPTION OF THE PREFERRED EMBODIMENTS

Figure 1:
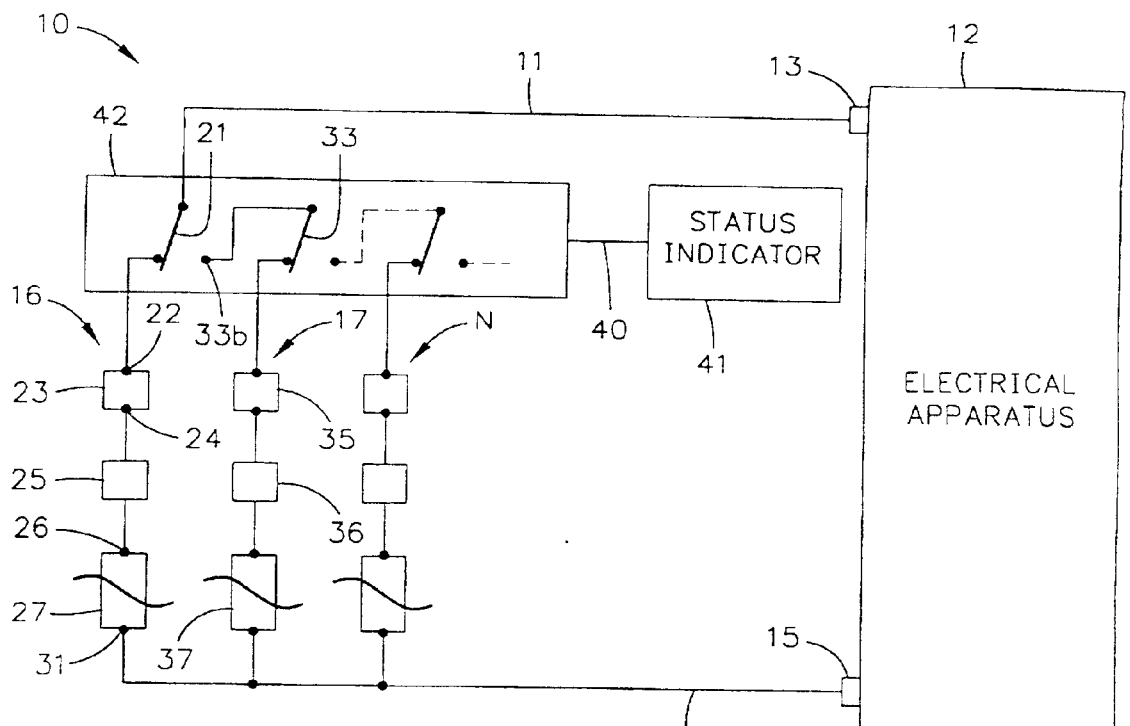
FIG. 1 is a schematic representation of the surge suppressor circuitry constructed according to the invention.

With reference now to the drawing, and more particularly to FIG. 1, there is shown cascaded suppressor circuit or device 10 for protecting sensitive electronic or electrical equipment 12. Line 11 of the suppressor connects to electrical apparatus 12 at terminal 13. Line 14 is connected to terminal 15 of the protected electrical apparatus.

Suppressor circuit 10 comprises at least two legs 16, 17, in this embodiment comprising multiple active circuit elements. First switch 21 is initially connected to terminal 22 of overcurrent device 23. Terminal 24 of device 23 is connected by thermally sensitive connection 25 to terminal 26 of suppressor element 27. Terminal 31 of suppressor element 27 is connected to line 14.

By way of example, switch 21 may be a mechanical device (see FIG. 5) which is biased toward terminal 33b of second switch 33. Switch 21 is held by device 23 in the position shown (its first state), and moves to terminal 33b (its second state) when device 23 fuses. Switch 21 could also be a relay or other type of electronic switch which changes from a first state connected to terminal 22 to a second state connected to terminal 33b upon fusing of device 23.

Overcurrent device 23 is intended to respond to a massive current surge and functions like a fuse. It may be a thin foil conductor, for example, which melts or breaks when passing a massive current surge. A "massive" current surge is one that would tend to cause harm to the connected suppressor device.

Element 25, on the other hand, is susceptible to heat. It may be a mechanical attachment element which connects overcurrent device 23 to lead or terminal 26 of suppressor element 27. Suppressor element 27, which may be an MOV, an SAD, or other appropriate component, tends to decrease its standby state internal resistance over time as it is connected in circuit for an extended period. As its resistance decreases, increased current through the suppressor element causes increased temperature to occur. Thermally sensitive connection 25 is chosen for its melting point to be at a temperature which opens and trips switch 21 before suppressor element 27 completely fails but as its failure is imminent. A suppressor failure is most often preceded by a rise in its body and lead temperature. When thermally sensitive connection 25 fails or melts, switch 21 moves to its second state, connecting line 11 through switch 21, terminal 32 and second switch 33 to second leg 17. This leg is a backup combination of overcurrent device 35, thermally sensitive connection 36 and suppressor element 37. Elements 35, 36 and 37 and switch 33 are then connected in the protective circuit and function identically to elements 23, 25 and 27 through switch 21 in leg 16.

As an optional feature, suppressor circuit status indicator 41 is coupled by means of connection 40 to block 42 which senses the positions of switches 21, 33 by any appropriate means and thereby the condition of suppressor elements 27, 37. Indication of available secondary suppressors that remain unused is useful and available information that can be displayed. That is, when the suppressor circuit of FIG. 1 is in the condition shown, status indicator 41 shows that switch 21 is in its initial position, with leg 16 providing the protection for electrical apparatus 12. When switch 21 moves to its second position, leg 16 is disconnected and leg 17 becomes the protective circuit. Block 42 includes appropriate sensors to determine the position of each switch 21, 33. The sensing of available suppressors that remain unused can be achieved using several methods including, but not limited to, voltage sensing of the circuit legs, current sensing of the circuit legs, and optical sensing of the switches. These sensors may be of any suitable type, including direct electrical connection to the switch terminals, optical sensors, infrared sensors, among others. The interpretation of data can also be achieved using several methods. The methods can employ microprocessors, digital circuits, or analog circuits, or a combination of two or more such means, to name a few. Indicator 41 provides indication by any suitable means, including a CRT, an LED or LCD panel, or even an electrical or mechanical annunciator, among others. It could also include an audible indication that one of the switches has changed state.

Note that when switch 21 is in its first state leg 17 and any additional legs are quiescent and are not actively connected in the protective circuit. When any element in leg 16 fails, or when suppressor element nears failure, switch 21 changes to its second state and switches leg 16 out of, and leg 17 into, the protective circuit. Additional such legs are indicated by "N", meaning that any desired number of protective legs may be incorporated into the device in accordance with the invention.

Figure 2:
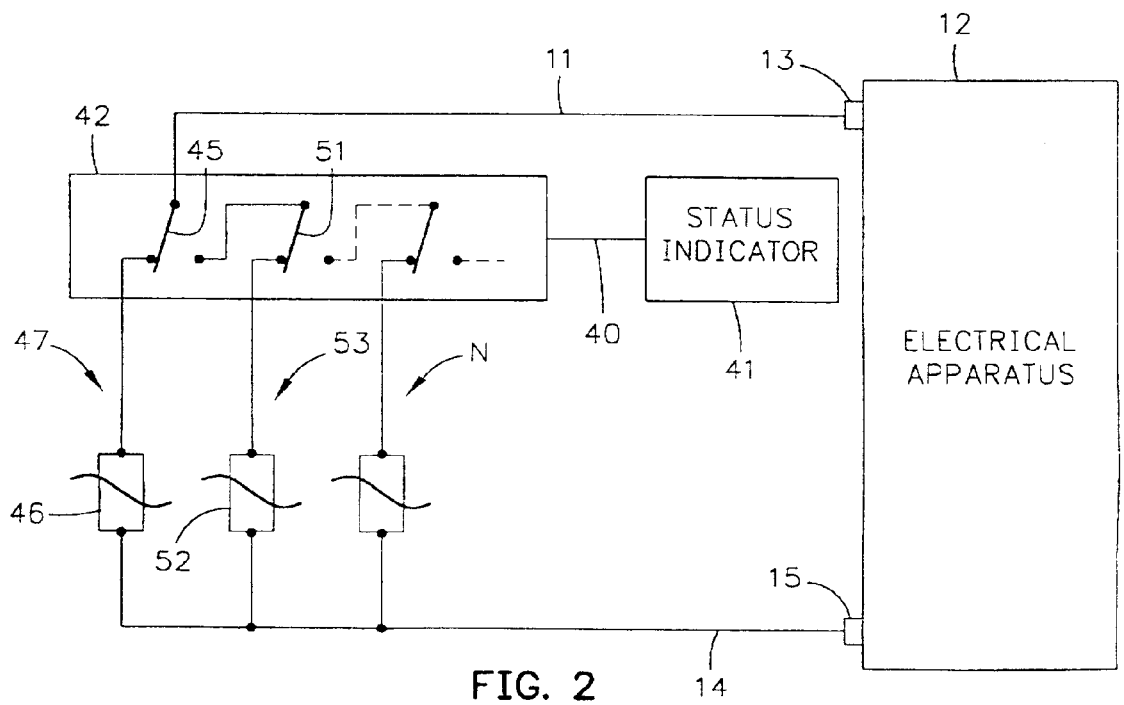
FIG. 2 is a partial schematic circuit showing a more basic configuration of the protective circuit of FIG. 1.

While the preferred configuration of the invention has been discussed above and shown in FIG. 1, a basic configuration is shown in FIG. 2. Here switch 45 is connected directly to suppressor element 46 in leg 47 and switch 51 is connected to suppressor element 52 in leg 53. Additional legs, initially in standby mode, not actively connected in the suppression circuit, can be employed as desired. As suppressor element 46 reaches failure, a change in current through it and through switch 45 occurs, causing the switch to move to its second state, connecting leg 53 into the protective circuit.

Figure 3:
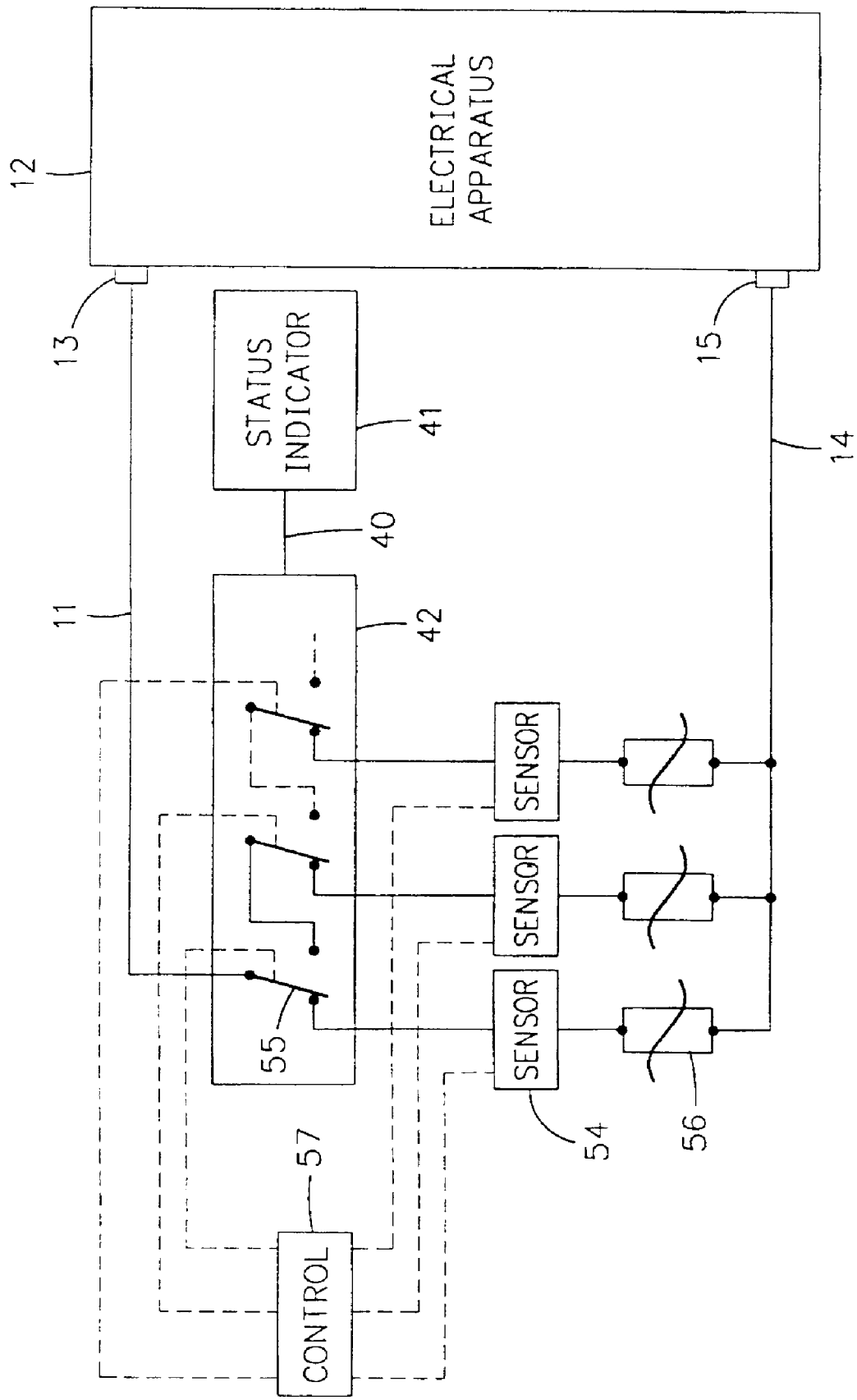
FIG. 3 is an alternative schematic representation of the protective circuit of FIG. 1.

A general representation of the FIG. 1 circuit is shown in FIG. 3, where sensor 54 and control 57 are coupled between switch 55 and suppressor element 56. Sensor 54 could encompass overcurrent device 23 and thermally sensitive connection 25 from FIG. 1, for example. Or it could include only one of those elements, or different means entirely for sensing an overcurrent or an over temperature condition. Anything which detects that the suppressor element is nearing failure, is beginning to fail, or has failed may be employed to cause switch 55 to move to its second position, switching suppressor element 56 out of the active position and making the second leg the operative one, as discussed above. Similarly, anything which senses any overcurrent or over temperature condition above a predetermined threshold value can act as sensor 54.

Figure 5:
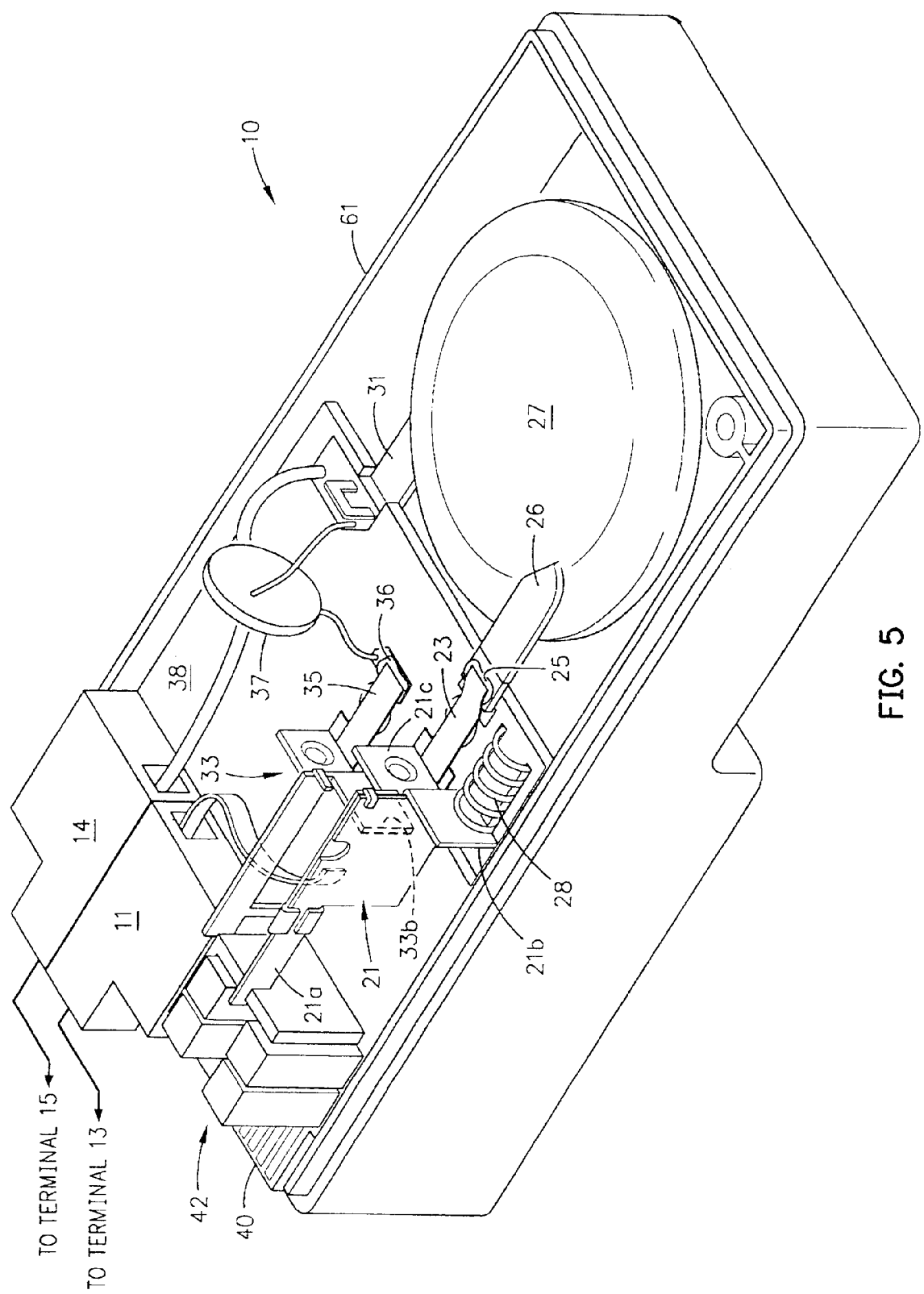
FIG. 5 is a perspective view of one example of a mechanical configuration for switching from one suppressor leg to another using the structure of the invention.

Control 57 can be any means, mechanical, electrical, or a combination, by which the position of switch 55 is shifted pursuant to the sensing of a condition being protected against. A mechanical arrangement is shown in FIG. 5. An electronic means which responds to a signal from sensor 54 to cause switch 55 to change position can be employed. An example is a reed switch or equivalent, but the invention is not so limited.

The connections between control 57 and sensors 54, as well as to switches 55, is shown dotted. This indicates that the couplings could be hard wired, mechanical, or even wireless, as desired.

The above description contemplates that low melting point solder will be used for sensing over temperature (element 25), and an overcurrent device 23 will function to sense current surges. Alternatively, over temperature sensing could be accomplished by means of a thermistor, a thermocouple or some other sensor. An overcurrent situation could be sensed by a current transducer, a shunt or a current transformer. A simple electronic circuit could be employed to process signals from any or each of these devices, such as could be embodied in control 57 of FIG. 3, which could drive a relay or a solid state switching element, functioning as switch 21, 33, 55. Aside from temperature or current, other signals which provide indication of the status of the suppression element could be used. For example, a pressure build-up in a sealed chamber in which the suppressor is housed and could be monitored, could be employed.

Switches 21, 33 are shown in their electrical schematic sense in the drawing. These switches may be mechanical switches, relays, SCRs, triacs, IGBTs, among others, which are well known to those skilled in the relevant technical field.

Figure 4:
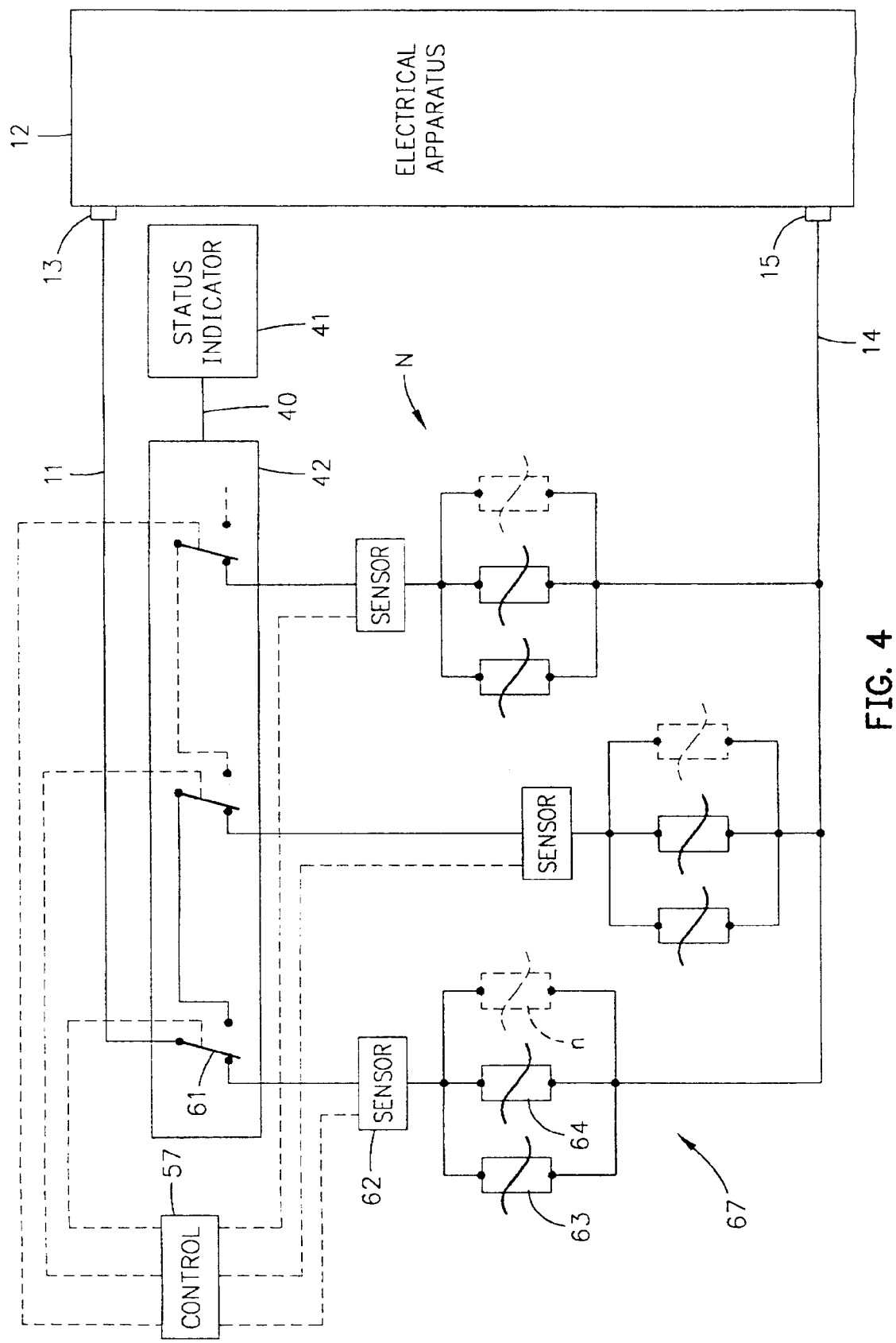
FIG. 4 shows how the surge suppressor elements of FIG. 1 can be paralleled in the same circuit.

While a single suppressor element is shown connected in each leg of the suppressor circuit, two or more such suppressor elements can be connected in parallel, as shown in FIG. 4. Here switch 61, control 62 and suppressors 63, 64 . . . n comprise leg 67.

A mechanical representation of the suppressor circuit is shown in FIGS. 5–11. FIG. 5 is a mechanical version of FIG. 1 and the parts are given the same reference numerals. An optional housing or frame 61, optionally having a cover 61*a* (FIG. 6), includes all of the elements of FIG. 1 which connect to protected electrical apparatus 12. Switch 21 is shown as a sliding double-L-shaped device. It has elongated body 21*a* which is biased by spring 28 toward the left, as it acts on arm 21*b*. Arm 21*c* is connected to the end of overcurrent device 23 and is spaced from switch 33. Thermally sensitive connection 25 connects device 23 to terminal 26 of suppressor element 27.

Figure 6:
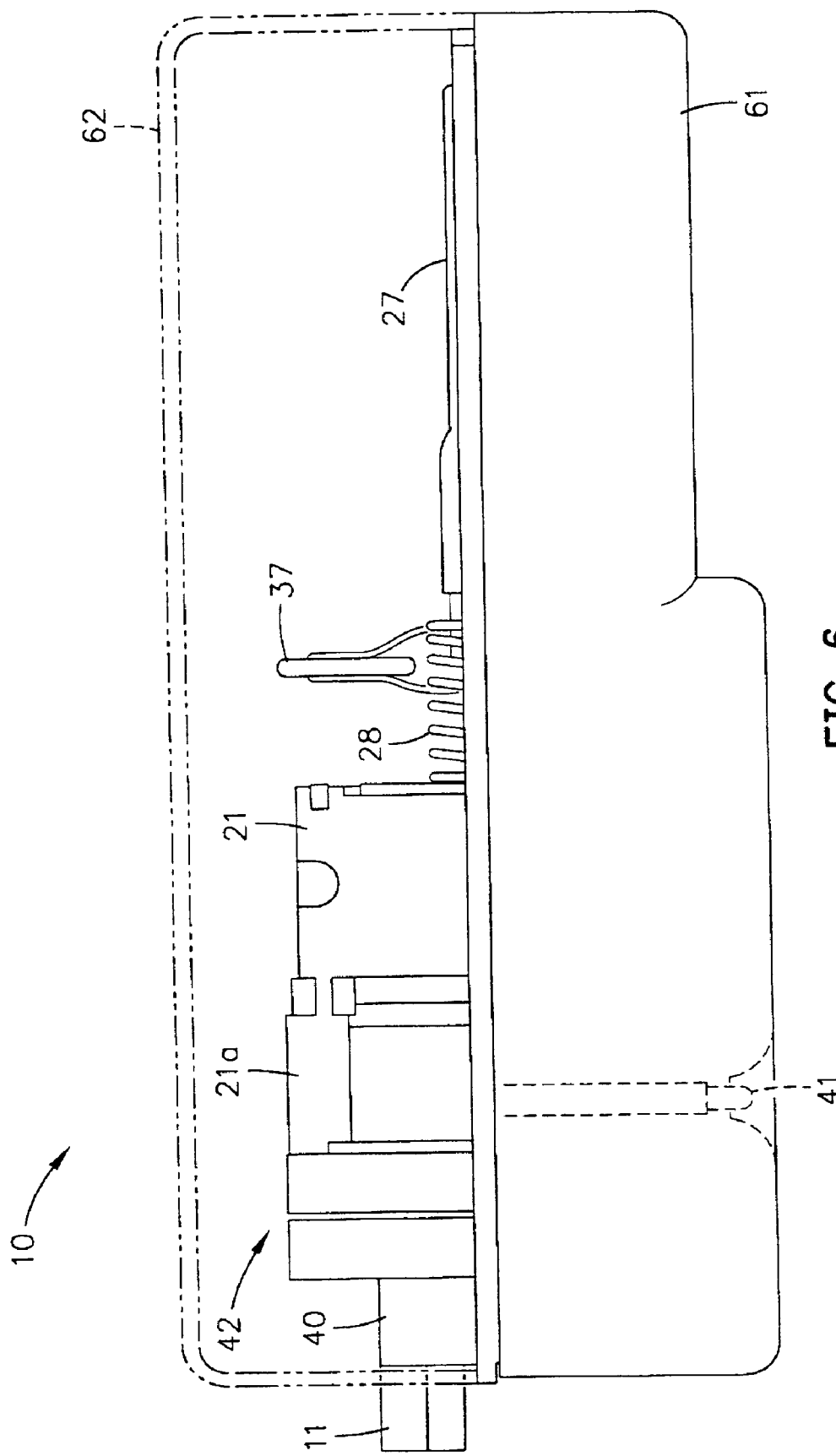
FIG. 6 is a side view of the FIG. 5 apparatus.

In the side view of FIG. 6 the operative portion of switch 21 can be seen in its initial position, as it would appear when connecting line 11, through leg 16 of elements 23, 25 and 27, to line 14. Optional cover 61*a* is provided because when an MOV is used as the suppressor element 27, 37, it may be subject to giving off gases or exploding when it fails. The cover protects the environment in case that type of failure occurs.

Figure 7:
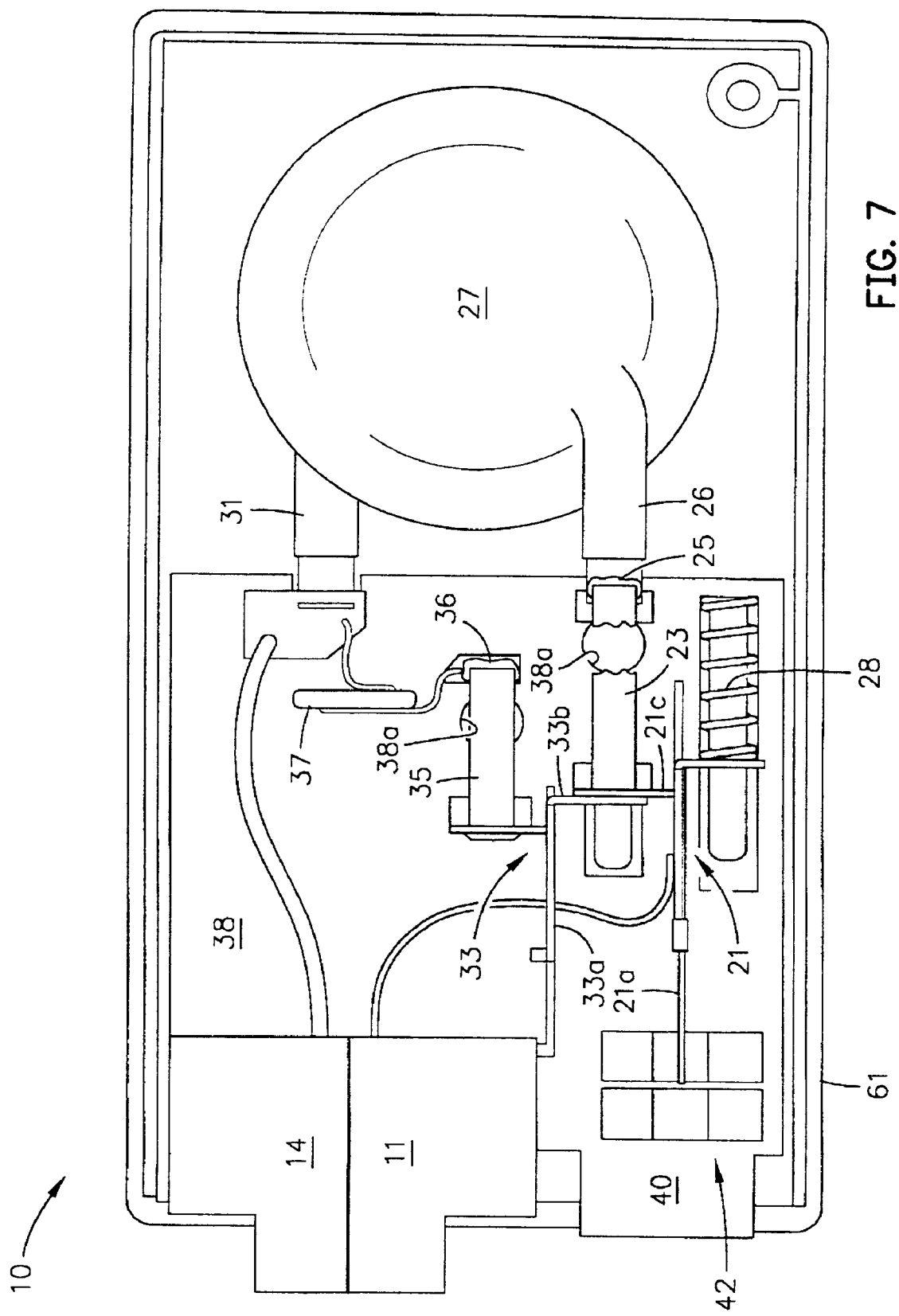
FIG. 7 shows the suppressor apparatus of FIG. 5 after the first overcurrent device has fused.
Figure 8:
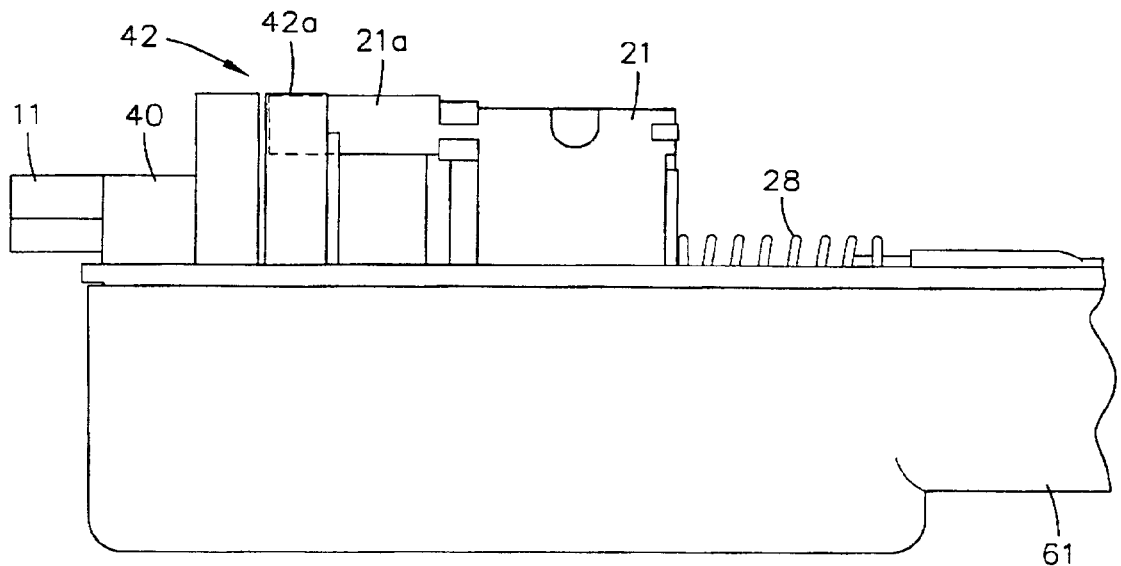
FIG. 8 is a partial side view of the apparatus in the FIG. 7 condition.

Overcurrent device 23 has fused at the location of hole 38*a* in board 38, as shown in FIGS. 7 and 8, allowing switch 21 to move to the left under the influence of spring 28. Arm 21*c* makes contact with arm 33*b* of switch 33, connecting MOV 37 into the protective circuit, along with overcurrent device 35 and thermally sensitive connection 36 (FIG. 1).

The FIG. 8 side view shows how the end of switch body 21*a* interacts with optical interrupter 42*a* as part of sensor 42 to create a signal which is detected and interpreted by indicator 41 (FIG. 6), which may be part of device 10 or may be located remotely.

Figure 10:
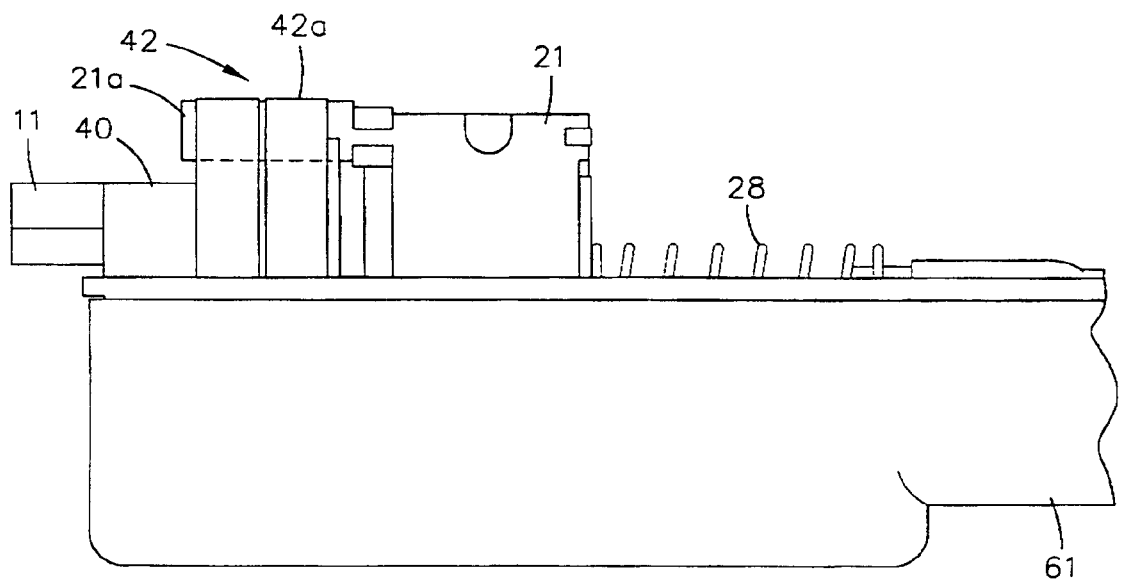
FIG. 10 is a partial side view showing the FIG. 9 condition.
Figure 9:
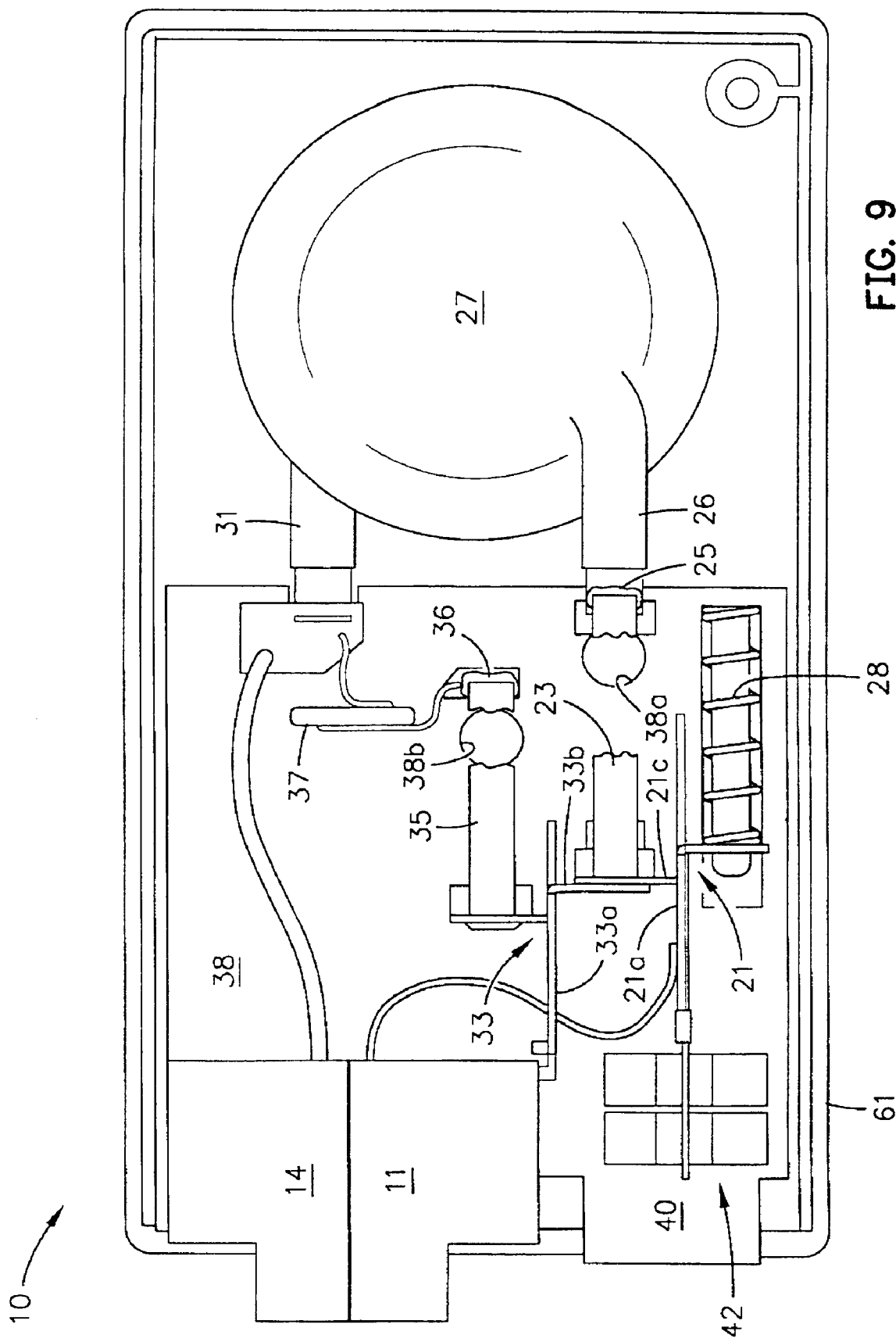
FIG. 9 shows the suppressor apparatus of FIG. 5 after the second overcurrent device has fused.

In FIGS. 9 and 10 the suppressor circuit has taken one more step when overcurrent device 35 fuses, allowing both switches 21 and 33 to move farther to the left under the influence of spring 28, thereby disconnecting second leg 17 from the protective circuit. The third leg of the protective circuit will then be connected if the apparatus provides for more than two legs.

Figure 11:
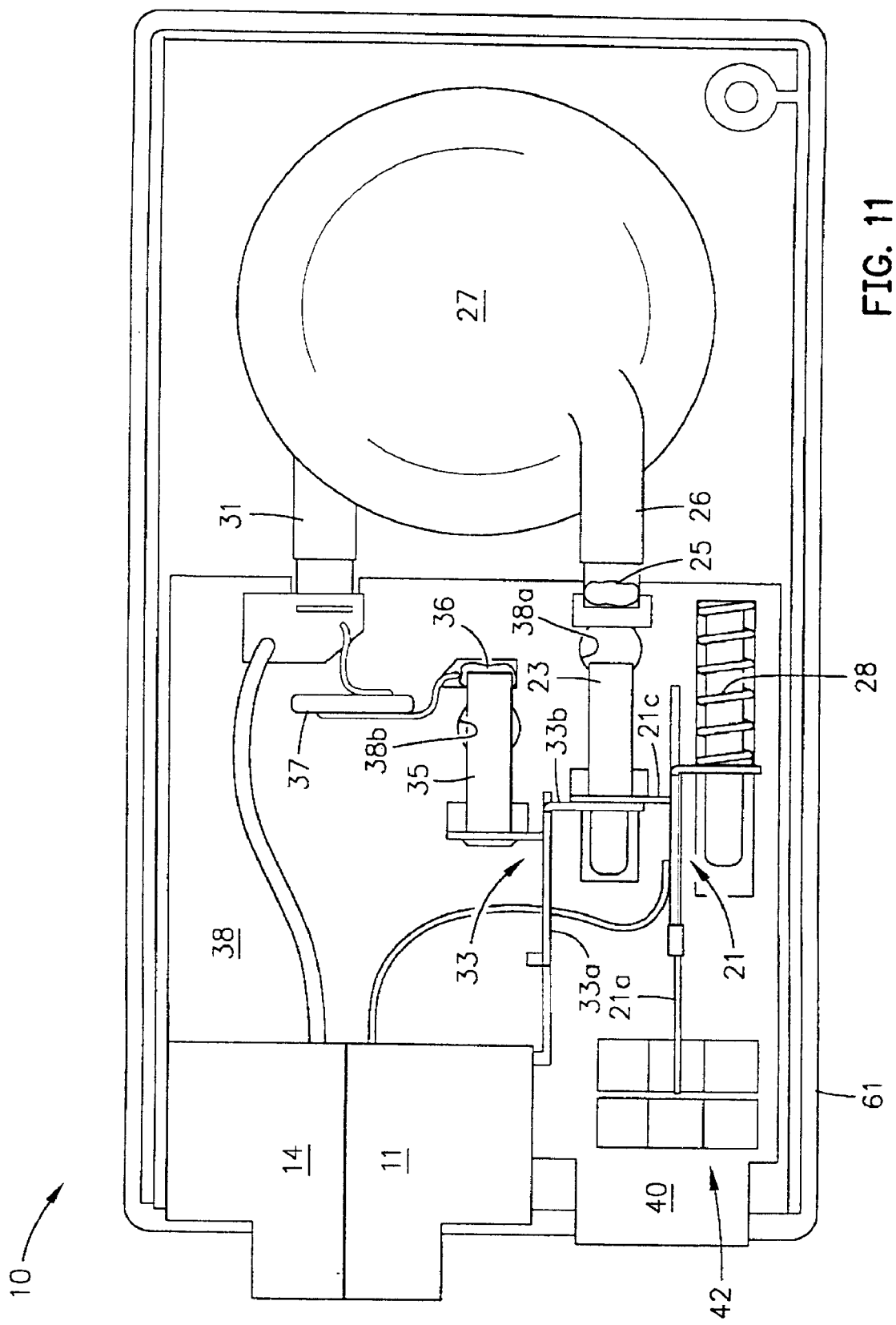
FIG. 11 shows the suppressor apparatus of FIG. 5 after the over temperature element has melted.

As a further example of how the mechanical structure functions, FIG. 11 depicts the situation where element 25 has melted, enabling switch 21 to move to the left as it did when element 23 opened or fused. This occurrence has the same result of disconnecting suppressor 27 from the protective circuit and connecting suppressor 37 into the circuit. If thermally sensitive connection 36 also melts, both switches will move as was shown in FIG. 9.

It is to be understood that FIGS. 5–11 show a practical, mechanical means for implementing the function of the FIG. 1 protective circuit. As stated before, there are many functionally equivalent elements that could accomplish the same end results mechanically, electro-mechanically or electrically. As a matter of fact, electrical components could be connected together in the manner of FIGS. 1–4 without being mounted to or on any physical structure. The important aspects of the invention are that a suppressor circuit includes a primary or first suppressor element operatively connected into the circuit and another, secondary, or second suppressor element in standby condition, not operatively connected in the circuit. Upon degradation or actual failure of the primary suppressor element, that element is switched out of, and the secondary element is switched into, the protective circuit. While two such switch controlled legs are described, any number of such legs may be employed. Further, there may be only a suppressor element, along with a switch, in each leg, as shown in FIG. 2.

While the suppressor circuits shown in FIGS. 1–4 shows each switchable leg as comprised of the same components in each embodiment, that is not necessarily so. For example, the second leg of the FIG. 1 embodiment could have the configuration of a leg in any of FIGS. 2,3 or 4. The same is true of any of the configurations of the invention shown. The first leg could be as shown in FIGS. 2,3 or 4 and the second leg could have the configuration shown in one of the FIG. 1 legs. With more than two suppressor legs there could be many combinations and permutations of leg configurations.

A special aspect of this suppressor is that a suppressor device has not previously been known which continually refreshes the suppressor protection. This makes the device much more valuable than simply detecting and warning when the load is not protected. It is also a much more effective method of indicating a decrease of protection than putting suppressor elements in parallel because the amount of protection available is more definable and more robust in that the suppressor that is used after the primary suppressor has failed has not been subjected to any transient voltages. Note that although parallel suppressor elements are shown in each leg in FIG. 4, additional selectively switched suppressor legs are part of that configuration, as in the other featured depictions. The system of this invention is more effective than capacitor and suppressor combinations because the system continues to have high energy handling capability after the primary suppressor has failed.

What is claimed is:

1. A surge suppressor system adaptable for protection of sensitive electrical devices from predetermined alternative conditions, said surge suppressor system comprising:

a suppressor circuit having electrical input connections and output connections;

a primary surge suppressor element in a first leg of said circuit;

at least one secondary surge suppressor element in a second leg of said circuit; and a switch by which said primary suppressor element is selectively connected in said circuit and switched out of said circuit, and said at least one secondary surge suppressor element is selectively switched into said circuit and said primary surge suppressor element is switched out of said circuit when said primary surge suppressor element is nearing failure, is beginning to fail or has failed.

2. The system recited in claim 1, wherein:

said switch has a first state and a second state and when in said first state said switch mechanism is biased toward said second state;

when in said first state said switch connects said primary surge suppressor element in said circuit while isolating said secondary surge suppressor element from said circuit; and when in said second state said switch connects said secondary surge suppressor element in said circuit while isolating said primary surge suppressor element from said circuit.

3. The system recited in claim 2, and further comprising a frangible link connecting said switch to said primary surge suppressor element in said first leg whereby, when a predetermined condition occurs, said frangible link breaks and said bias causes said switch mechanism to switch said primary surge suppressor element out of said suppressor circuit and switches said secondary surge suppressor element into said suppressor circuit.

4. The system recited in claim 1, wherein said primary surge suppressor element comprises a plurality of surge suppressor elements connected in parallel.

5. The system recited in claim 1, wherein said secondary surge suppressor element comprises a plurality of surge suppressor elements connected in parallel.

6. The system recited in claim 1, wherein said primary surge suppressor element is a metal oxide varistor (MOV).

7. The system recited in claim 1, wherein said secondary surge suppressor element is a silicon avalanche diode (SAD).

8. The system recited in claim 1, and further comprising an indicator coupled to said circuit to show the status of said suppressor elements.

9. A surge suppressor system adaptable for protection of sensitive electrical devices from predetermined alternative conditions, said surge suppressor system comprising:

a suppressor circuit having electrical input connections and output connections;

a primary surge suppressor element in a first leg of said circuit;

at least one secondary surge suppressor element in a second leg of said circuit;

a first sensor coupled to said primary surge suppressor element in said first leg, said first sensor being adapted to detect the existence of at least one said predetermined condition;

a switch by which said first leg is selectively connected in said circuit and switched out of said circuit, and said at least one secondary surge suppressor element is selec tively switched into said circuit and said primary surge suppressor element is switched out of said circuit when at least one of said predetermined conditions has occurred; and a control device coupling said first leg and said switch.

10. The system recited in claim 9, wherein:

said switch has a first state and a second state and when in said first state said switch mechanism is biased toward said second state;

when in said first state said switch connects said primary surge suppressor element in said circuit while isolating said secondary surge suppressor element from said circuit; and when in said second state said switch connects said secondary surge suppressor element in said circuit while isolating said primary surge suppressor element from said circuit.

11. The system recited in claim 9, wherein said control device switches said switch to a second state from a first state.

12. The system recited in claim 9, and further comprising a third sensor connected between said switch and said primary surge suppressor element in said first leg, said third sensor being adapted to detect the existence of at least one said predetermined condition.

13. The system recited in claim 10, wherein said first sensor comprises a frangible link connecting said switch to said primary surge suppressor element in said first leg whereby, when a predetermined condition occurs, said frangible link breaks and said bias causes said switch mechanism to switch said primary surge suppressor element out of said suppressor circuit and switches said secondary surge suppressor element into said suppressor circuit.

14. The system recited in claim 9, wherein said primary surge suppressor element comprises a plurality of surge suppressor elements connected in parallel.

15. The system recited in claim 9, wherein said secondary surge suppressor element comprises a plurality of surge suppressor elements connected in parallel.

16. The system recited in claim 9, wherein said primary surge suppressor element is a metal oxide varistor (MOV).

17. The system recited in claim 9, wherein said secondary surge suppressor element is a silicon avalanche diode (SAD).

18. The system recited in claim 9, and further comprising an indicator coupled to said circuit to show the status of said suppressor elements.

19. The system recited in claim 11, wherein said control device responds to a signal from said sensor to cause said switch to switch from its first state to its second state.

20. The system recited in claim 9, and further comprising more than two legs in said circuit, each said leg having a surge suppressor element therein.

21. A surge suppressor system adaptable for protection of sensitive electrical devices from predetermined alternative conditions, said surge suppressor system comprising:

a suppressor circuit having electrical input connections and output connections;

a primary surge suppressor element in a first leg of said circuit;

at least one secondary surge suppressor element in a second leg of said circuit;

a first sensor connected in said first leg, said first sensor being adapted to detect the existence of at least one said predetermined condition;

a second sensor connected in said first leg, said second sensor being adapted to detect the existence of at least one said predetermined condition;

a switch by which said first leg is selectively connected in said circuit and switched out of said circuit, and said second leg is selectively switched into said circuit and said first leg is switched out of said circuit when said first surge suppressor element is nearing failure, is beginning to fail or has failed, or when at least one predetermined condition has been detected by either said first sensor or said second sensor; and a control device for controlling the changing of said switch to connect said second leg into said circuit.

22. A method for suppressing surges in a surge suppressor adapted to protect electrical devices, the surge suppressor having a surge suppression circuit with at least two surge suppressor elements, the method comprising steps of:

selecting a first of said at least two surge suppressor elements for active operation;

detecting whether the first surge suppressor element is nearing failure, is beginning to fail, or has failed;

and upon detecting whether the first surge suppressor element is nearing failure, is beginning to fail or has failed, selecting a second of said at lest two surge suppressor elements for active operation in the surge suppressor circuit and deselecting said first surge suppressor element.

23. The method recited in claim 22, wherein the step of detecting comprises monitoring the functional status of the first surge suppressor element.

24. The method recited in 22, and further comprising the step of providing an indication that the surge suppression circuit has exhausted at least said first suppressor element.

* * * * *